March 19, 1968     J. W. REESOR ET AL     3,374,335

METHOD OF ARC WELDING A CIRCULAR JOINT

Filed Dec. 8, 1964

INVENTOR.
JAMES W. REESOR
BY GEORGE W. FREHAFER

*Glenn Palmer*
*Matthews*
HIS ATTORNEYS

United States Patent Office 3,374,335
Patented Mar. 19, 1968

3,374,335
METHOD OF ARC WELDING A CIRCULAR JOINT
James W. Reesor, Richmond, Va., and George W. Frehafer, Valencia, Pa., assignors to Reynolds Metals Company, Richmond, Va., a corporation of Delaware
Filed Dec. 8, 1964, Ser. No. 416,848
14 Claims. (Cl. 219—60)

This invention relates to a method of welding, and particularly to a method of welding beveled grooves between two adjoining aluminum alloy members in an improved manner.

While the novel method of this invention is particularly applicable to the butt end welding of aluminum alloy pipes in position, it is also applicable to the welding of aluminum alloy members which have other surfaces, such as vertical surfaces or overhead surfaces, and the like.

Surfaces are welded with the use of a metallic inert gas welding method which is generally known by the abbreviation MIG. In this procedure an electric arc is maintained in an inert gas atmosphere between a welding wire and the material being welded, and the wire is fed into the arc continuously to form the filler material.

In such methods, there is a marked tendency for the welding metallic puddle, which is formed by the arc, to run ahead of the arc as the arc moves downwardly along a groove such as is formed by two butting horizontal aluminum alloy pipes. This causes incomplete penetration of the weld through the material being welded and the result is a weld with much less than optimum strength. In view of the unsatisfactory type of welding that such procedure produces, there has been a tendency to weld pipes of this character by upward runs from the bottom of the circular groove to the top on one side of the pipes, and then to make another run on the other side of the pipes upwardly from the bottom to the top of the groove. This procedure has been repeated in the groove a number of times, to fill the beveled groove which is generally provided between the butting ends of the pipes. This requires repeated stopping and starting of the welding arc in an unsatisfactory manner.

According to this invention, welding wire is used which is made of relatively high magnesium content magnesium-aluminum alloys, which heretofore have been considered unsatisfactory for downward welding on vertical surfaces because of a black smudging action which is produced by the oxidation of the magnesium content of the alloy.

According to this invention, much higher welding current densities are used than have heretofore been used in this type of welding. A precise matching of the welding wire diameter to the pipe wall thickness is provided. This provides satisfactory groove welds, with the inert gas torch traveling completely around the circular groove in at least a complete 360° weld path around the pipes, as often as desired. This very materially reduces the starting and stopping of the arc, as compared to previous practice.

The detailed procedure and advantages to be gained by the method of this invention are fully set forth in the following description, in connection with the accompanying drawings in which.

Words will be used in the description, claims and illustrations which, at times will be applied to the relative positions of the various members as they occur at the top of a circular groove between two contiguous ends of aligned pipes to be welded together. However, such description and illustration are used in this manner for the sake of clearness and brevity, and it is to be understood that the groove, electrode, etc., may have other relative positions in actual use, as is obvious.

This invention is an improvement over prior pipe welding procedures and the like. For example, reference is made to the entire disclosures of the patents to Bruno et al., 2,960,597, patented Nov. 15, 1960, and Staley, 3,035,156, patented May 15, 1962, to disclose and illustrate apparatus and methods heretofore used. They also disclose and illustrate apparatus with which the method of this invention may be practiced.

In the Bruno et al. patent FIGURES 1, 2, 29 and 36, for example, illustrate how a series of aluminous or aluminum alloy pipe sections 50, 51 may have their abutting ends welded at 55 by the MIG method, with the use of the electrode and inert gas nozzle or head 225. This head 225 may be rotated about the vertical circular joint 55 and welding may be performed "with 180° upward welds on each side of the joint 55" as described in column 12, lines 44+, or "The welding operation may take place downwardly and upwardly throughout the 0°–360° and 360°–0° rotations" as described in column 13, lines 5 and 6.

In the Staley patent, the welding head 20 may be rotated about a pipe joint similarly to 55 of the Bruno patent. The Staley head 20 may be oscillated in an adjustable manner while it rotates about the joint, or the head need not be oscillated, as desired.

Figure 1:
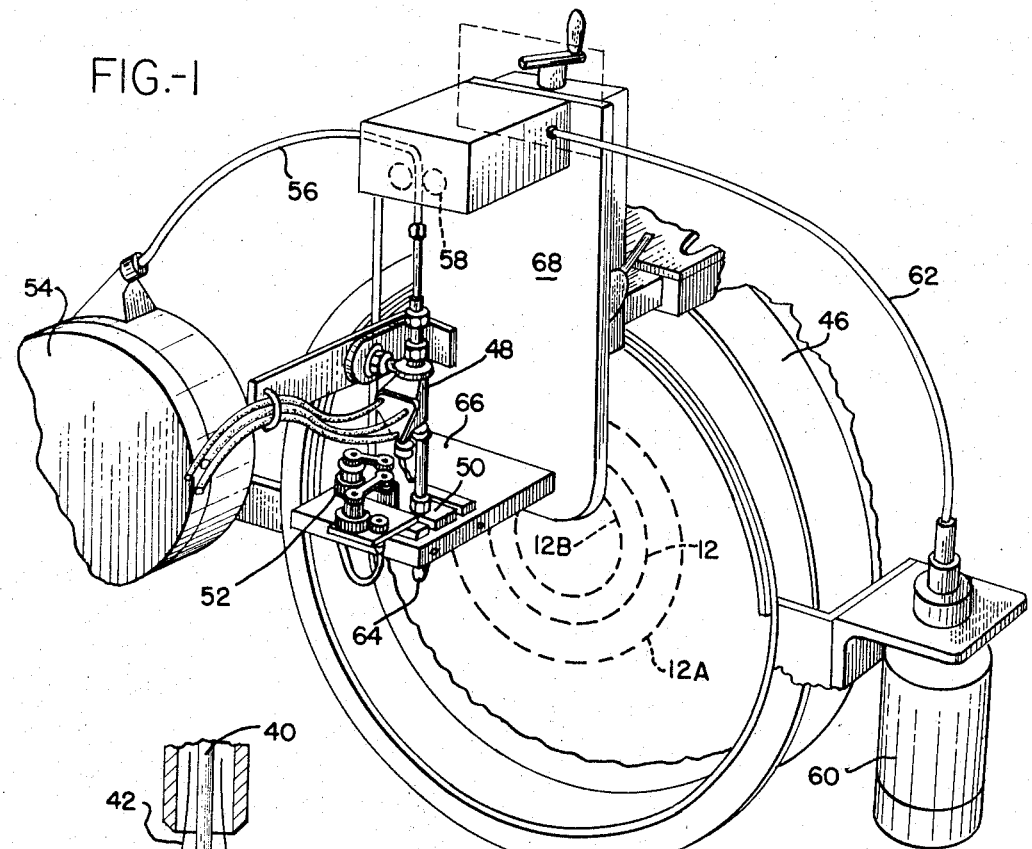
FIGURE 1 is a perspective view of an apparatus suitable for practicing this invention.

FIGURE 1 of this application is generally similar to FIGURE 1 of the Staley patent, and applicant's FIGURE 1 is intended to be emblematic of any machine of this general character which may be used to practice applicant's invention.

While the said Staley patent clearly describes the machine involved, and particularly in conjunction with the Bruno and Staley patent, the following brief description is now made. Reference is made, however, to the two patents in their respective entireties for a more detailed disclosure of a suitable machine.

Figure 2:
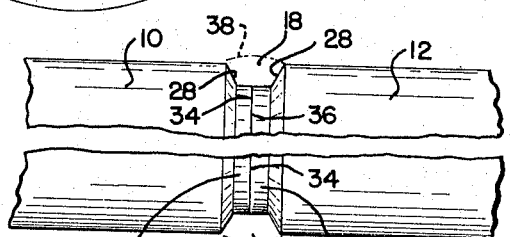
FIGURE 2 is a diagrammatic representation, with parts broken away, of two aligned pipes to be welded together according to this invention.

The machine, which is diagrammatically shown in applicant's FIGURE 1, may include a generally cylindrical casing 46, which may be placed around one of a series of pipes, such as the pipe 12 of FIGURE 2, which pipe is diagrammatically indicated at the dotted circle 12 of FIGURE 1. The machine welds the pipe 12 to the pipe 10 of FIGURE 2 and is then moved to a joint between pipe 10, for example, and another pipe, etc.

Larger pipes, such as indicated by the dotted circle 12A, or smaller pipes, such as indicated by the dotted circle 12B, may be placed within the cylindrical casing 46 for constructing pipe lines of varying diameters.

A welding head 48 may have its lower end oscillated, if desired. To cause this oscillation, the lower end of the gun 48 passes through an oscillatable plate 50. The plate 50 may be oscillated in varying manners by the mechanism 52, or need not be oscillated at all, if desired, as more fully described in the Staley patent. The wire electrode 40 of FIGURE 4 may extend out of the lower end 64 of the welding head 48 and may be oscillated to form the zigzag path of Staley FIGURES 12 and 16, the circular path of Staley FIGURES 14 and 17, the elliptical or oblong path of Staley FIGURES 15 and 18, or straight path, as desired.

The electrode wire 40 may be supplied from a spool within the casing 54, and passes through an insulated tube 56 past the wire feeding mechanism 58. The feeding mechanism 58 may be actuated by the variable speed and reversible motor 60, which has a flexible drive 62 drivingly connected to the feeding mechanism 58. The speed of the motor may be controlled by a speed control system which may include a remote manual or automatic speed control of the motor 60. The electrode wire 40 is fed out of the lower end 64, FIGURE 1, of the gun 48. Therefore, the end part of the electrode wire 40 is directed toward the groove 18 of FIGURES 2 and 3. by the mechanism shown in FIGURE 1, in the manner more specifically disclosed in the Staley patent and/or the Bruno and Staley patent.

The gun 48, and the supporting structure, including a platform 66, and a bracket 68 may be rotated about the groove 18 between the pipe ends 14 and 16, as more fully described in the aforesaid patents, to point the end of the electrode wire 40 more or less radially toward the center axes of the pipes 10 and 12. Control means are provided for regulating the speed of rotation of the gun 48 about the groove 18, as well as the slant of the electrode wire and the longitudinal movement of the electrode wire to produce various fillet beads in the groove 18.

Figure 4:
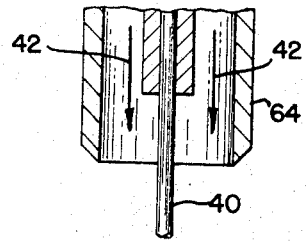
FIGURE 4 is a diagrammatic representation of a welding head to feed the electrode wire.

When using the machines of the Staley and Bruno patents according to the previous methods, the wire 37 of the Staley patent, or wire 40 of this application was made of any suitable aluminum alloy from the series 4,000 and current densities of from 80,000 to 125,000 amperes per square inch would be imposed on the wire 40 illustrated in FIGURE 4 of this invention. When using the filler wire 40 according to the old methods, it was preferred to start the welding operation at the bottom of the groove and would then be moved up along one side of the pipes to the top of the groove and then the welding operation would be stopped and another weld would be started at the bottom and would go up to the top on the other side of the pipes as described in column 12 of the Bruno patent, lines 44 to lines 71. The reason for limiting the welding to an upward motion only along the groove was because the molten weld puddle had a tendency of flowing faster than the motion of the arc produced at the end of the wire and this would cause a very unsatisfactory weld in the groove as will be more fully elsewhere described.

Attempts were made to use the machines with a continuous all around or 360° pass around the groove, as described in column 13 of the Bruno patent, lines 3 to 6, and in the Staley patent. However, such attempts were generally not satisfactory because the puddle would run ahead of the arc on the downward part of the cycle, and make the weld unsatisfactory.

Attempts were made to use wire made of aluminum alloy series 5000 under similar conditions as were used for the series 4000 wire. However, the 5000 series wire has a relatively high magnesium content and produces a more ductile and stronger weld. Also, melted 5000 series alloy is less fluid than method 4000 series alloy and consequently its weld puddle has less tendency to run ahead of the welding arc when a weld is being made downward on a vertical surface. However, its relatively high magnesium content generally caused a black smudge which would be included or distributed in the weld, and this generally caused excessive weld porosity. This weld "porosity" in the weld is generally caused by gas inclusion in the weld, the gas being generated by the burning of the impurities which became entrapped in the welding during the welding process.

Therefore, it is to be seen that while series 5000 welding wires were desirable because of the ductile type of weld that they could produce, they were not satisfactory when used with the current densities that were then used. It will be shown that, according to this invention, the 5000 series welding wires may be used, such as an aluminum alloy No. 5356 welding wire, instead of the usual aluminum alloy series 4000 wires, such as the 4043 wire, which 4000 series wire was the run of the mill wire used in welding procedures of this type. The 5000 series wires have sufficient surface tension during welding to hold the molten weld puddle in place on the downhill welding, so that the molten weld metal will stay in place and not run ahead of the arc. With the 5000 series wires, the arc is not impinged on the molten metal, when used according to this invention, and does not cause weld porosity or lack of weld penetration. "Penetration" is the knitting or welding together of the weld groove.

Previously, with the 4000 series wires, downhill welding had been possible by using a relatively extremely "cold" arc, to keep the weld puddle cool enough that it didn't tend to run ahead of the arc, but this caused a lack of fusion of the filler metal to the base metal of the pipes, and caused a brittle weld with poor strength. A "cold" arc does not put sufficient energy into the filler metal and into the base metal, and hence the two metals are not sufficiently fused together.

According to this invention, to permit 360° butt welding of pipes and the like, welding conditions are determined so that the filler metal, of the 5000 series, does not run ahead of the arc and cause such porosity and lack of penetration, and at the same time avoids production of "cold" welds.

Secondary problems are also solved by this invention to obtain a proper weld. There are:

(1) The weld is made to track in the groove properly, since if the weld does not track the groove properly, there is not complete penetration of the weld.

(2) Weld with an aluminum alloy series 5000 welding wire such as an aluminum alloy No. 5356 wire, instead of the aluminum alloy series 4000 welding wire.

Other aluminum alloy welding wires besides the 5000 series may be used, according to this invention, if such wires have the characteristics herein described in connection with the 5000 series wires.

It has been found that with the use of previous welding current densities, in connection with the high magnesium content aluminum alloy series 5000 wires, apparently the magnesium in the wire produces an oxide during the welding process. This is a black smudge, which becomes included in the weld and causes weld porosity. This black smudge is deposited ahead of the weld so that the arc cleaning of the parent metal which normally precedes such deposits of the filler metal during welding is very poor.

Normally this causes weld defects only when welding downward on vertical surfaces and possibly when welding overhead. It doesn't appear to cause much trouble when welding on horizontal surfaces (top of them) or when welding up on vertical surfaces. In any event, increasing current densities eliminates it.

The preliminary cleaning of the parent metal of the pipes by the arc is very necessary for the fusion of the filler metal to the parent metal of the pipes. Normally, during aluminum welding, the arc strips the aluminum oxide from the parent metal of the pipes ahead of the filler metal puddle. The arc also melts the filler metal and fuses it into the parent metal. All of these actions are happening simultaneously under a shielding cloud of inert gas which prevents reoxidation of the parent metal which has been stripped of oxide by the arc and also prevents oxidation of the hot filler metal. However, it has been found that when using the 5000 series wires with the normal current densities of 80,000 to 125,000 amperes per square inch, the formation of the black smudge above described is formed on the pipe parent metal which then becomes included in the subsequent weld formation with the consequent porosity above described.

According to this invention, current densities in the order of 200,000 to 250,000 amperes per square inch are used in combination with the matching of the welding wire size to pipe wall thickness. This is also combined with proper groove angle configurations. These factors will be pointed out in further detail.

The use of current densities in the order of 200,000–250,000 amperes per square inch, in combination with the series 5000 wires, as herein used, gives a much stiffer arc than the lower current densities heretofore used. That is, the arc tends to point directly from the wire axis, rather than to be distracted or strayed to the sides of the beveled groove used in this application. That is, with the stiffer arc, at these higher current densities, the arc may be applied directly to the base of the bevel with little or no tendency to wander from the side of the beveled groove to the opposite side of the beveled groove. There is no tendency to produce bridging or a bridging condition in the weld. "Bridging" is a bridge of solidified filler metal which has each respective end attached to the middle of each of the two pipe bevels with a gap at the base of the bevels.

Having overcome the problem of cleaning the base metal by the high density currents above pointed out, the next problem solved is to set up welding conditions such that the filler wire is deposited into the weld groove and frozen at such a rate that the weld puddle does not tend to run into the arc when welding downhill. That is, the filler metal has to solidify practically as soon as it is deposited. To accomplish this, the parent metal of the pipes has to form a "heat sink" such that the parent metal absorbs the heat generated by the welding process at approximately the same rate as the heat is generated. If this is not done, the molten metal will run ahead into the arc, with the arc impinging on the molten weld metal in a manner to cause porosity and lack of penetration in the weld. In order to accomplish this, it is necessary to match the size of the welding wire to the thickness of the parent material much more precisely than was normally done in welding, and also to tailor or provide the proper welding groove, formed by the pipe end bevels, to provide the proper "heat sink." The basic procedure for accomplishing this is as follows:

(1) Determine the current densities required to get good welding cleaning with a 5356 wire, and with the particular nature and thickness of the members being welded, for example:

(2) Select a wire size which when this current density is maintained, will give a weld puddle which freezes as fast as deposited, to prevent the running ahead of the molten weld metal into the arc, and thus prevent "curtaining," which curtaining would prevent proper penetration of the weld metal into parent metal of the pipe. "Curtaining" is flow of the molten weld puddle under the arc so that the arc impinges on the puddle instead of parent material.

(3) At the same time provide or tailor, or design the weld groove size and shape to provide the proper heat sink conditions for use with the wire selected.

In order to accomplish the 360° welding, it is necessary to keep a precise control over the welding voltage used. That is, primarily the welding voltage is regulated to the desired value once a given value of voltage has been selected. Normally, in automatic welding with the MIG process there is used what is commonly called a constant voltage generator. This is a generator whose output voltage does not vary appreciably when even large variations in its output current occur. Welding current with the MIG process using a constant voltage generator is determined primarily by the rate at which the wire is fed into the arc. In order to provide precise enough control of the welding voltage, that is, regulation of the welding voltage, it is necessary to modify a standard constant voltage generator so that it provides more precise regulation of the welding voltage. Normally, if the generator does not have a flat output curve, such as shown at 73 in FIGURE 5, in which the output "curve" which is a "curve" of voltage vs. current, and should be a straight line for best results with the welding procedure of this invention.

Figure 5:
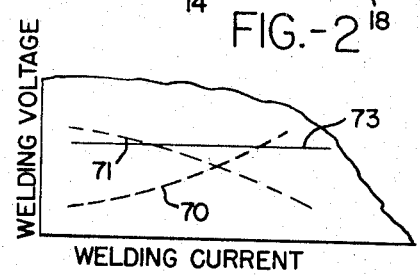
FIGURE 5 shows the voltage output versus the current output of a welding generator suitable for practicing this invention, in comparison with the outputs of generators used previously.

A generator which has the capacity and automatic regulation to provide such a straight line "curve" as shown at 73 in FIGURE 5, may be obtained from generator manufacturers, and such manufacturers can provide sufficient regulation and capacity of the generator, to maintain the straight line "curve" 73 when used with the particular welding requirements of the apparatus or method with which the generator is to be used.

The rate of metal deposit is also determined by the speed with which the wire is fed to the arc. If in the process of increasing the amount of metal deposit, which may be desirable on many occasions, and the welding voltage tends to drop when the current increases, which happens with most welding generators, the arc becomes too cold; that is, the welding voltage becomes too low, and the arc becomes too short, so that proper fusion of the weld metal to the parent metal is not obtained. On the other hand, if the amount of wire feed is decreased, the welding voltage will rise and then the arc voltage becomes too high, and the arc length becomes too long, so that the arc will be physically increased in length. It then loses its drive, and there is not a proper penetration into the parent metal. Also, an arc which is too long has a tendency to apparently put most of the heat into the pipe rather than into the fusing of the filler metal. A short arc has very good penetration, but if it is too short, it will tend to make a "cold" weld, that is, one which does not have sufficient fusion of parent metal and filler metal and there is a very rough weld deposit.

The desirable condition, therefore, is to pick a welding voltage which will remain stable even though the amount of filler metal being deposited is varied to over a wide range. This gives very precise control of weld deposit, since the amount of heat is well as the amount of wire feed metal deposited is also a function of wire feed rates, since welding current goes up and down with wire feed rates, and welding current is one measure of the amount of heat energy being put into the pipe.

Actually, either a slight rising or dropping of voltage with current changes can be tolerated so long as it isn't severe. It is desired principally to have it constant, and a slight tendency to drop when current increases will prevent a runaway situation. Increasing current caused by random transient condition, increases voltage which further increases current causing further increase in voltage. This round robin continues until current is excessive and burns a hole in pipe. Also high voltage causes long arc which reaches back into welding gun and fuses the welding wire to the gun. A slight variation in generator output voltage can be tolerated, so long as a substantially constant voltage appears at the welding gun or torch. There is normally some loss of voltage between generator and gun because of electrical resistance in cables connecting them.

The things that are different about the process of this invention are:

(1) The higher current densities that are used, such as 200,000–250,000; and (2) The precise matching of the welding wire diameter to pipe wall thickness, as obtained by test runs. With the usual thickness of aluminum pipes as herein described, a welding wire of .035 inch, more or less, and of 5356 aluminum alloy have been found to give satisfactory conditions.

Figure 3:
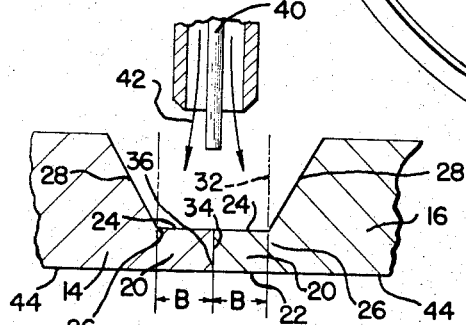
FIGURE 3 is an enlarged cross section showing portions of the contiguous ends of the pipes shown in FIGURE 2.

(3) Also, the groove configuration is critical to this invention. If the groove angle is less than 30°, more or less, the groove is so narrow that the arc does not impinge, that is, the groove wall is so steep that the arc does not impinge on its sufficiently to fuse into the wall. On the other hand, if the groove angle is materially greater than 30°, the weld puddle either becomes so large that it tends to curtain, or cover, the arc and also it requires an excessive amount of weld metal to fill the groove. Also, it has been found that the square nose on the groove, such as at 20 in FIGURE 3, is desirable for proper penetration as is the fact that the noses of the groove should be butted together for proper penetration, as shown in FIGURE 2. There should be no material spacing between the pipes.

Previous arc speeds along the joint have been in the order of 18 inches per minute, more or less. According to this invention, the high 200,000–250,000 amperes per square inch density, elsewhere stated, permits an arc speed of 60 inches per minute, more or less. Under these conditions, the puddle is maintained relatively small, and sufficient heat is provided and sunk into the bodies of the pipes and into the weld to provide the desirable results of this invention.

The desired output characteristic of the welding voltage generator is shown in FIGURE 5 by line 73. It indicates how a given generator voltage output remains constant regardless of current drawn from the generator. The dotted lines 70 and 71 indicate the output characteristics of generators that are not desirable. The voltage of 70 rises as current increases. The voltage of 71 falls as current increases.

With previous practice of welding the joints, an aluminum alloy pipe line of 5.1 inches internal diameter and a .224 inch wall thickness had a limit of resistance to internal pressure of 3,000 p.s.i. On the other hand, a pipe line of similar size and thickness of metal, which is a typical use of this invention, with the joints formed according to this invention, had a limit of resistance to internal pressure of 3,800 p.s.i.

Hence, to weld pipes together, according to this invention, the contiguous pipe ends 14 and 16 are shaped to form a circular fillet receiving groove 18, as shown in FIGURES 2 and 3. Each contiguous end 14 and 16 has an end land 20 with substantially coaxial inner and outer cylindrical surfaces 22 and 24. The outer cylindrical surface 24 of the land joins an outwardly beveled pipe end and edge 28 at the zone 26 and extends outwardly from its respective land at an angle to the plane 32 which is perpendicular to the outer cylindrical surface 24 of the land 20. This angle may be 30° angle, more or less. The contiguous ends 34 preferably are butted together as nearly as possible. The formation of the pipe ends should be such that, generally, there is no larger space between the butting ends than 1/16 of an inch, which may be accidentally caused by the variation in tolerances in forming the ends of pipes according to this invention.

A welded fillet, indicated by the dotted line 38 in FIGURE 2, may be introduced into the groove 18. Such fillet may be introduced into the groove by the action of a passing welding arc, produced from an aluminum alloy electrode wire 40, of the 5000 series, or equivalent, such as wire No. 5356 and which under ordinary conditions of pipes such as herein contemplated, may be substantially .035 inch in diameter, more or less. The wire is directed toward the groove 18. An inert gas, such as argon, is introduced into the welding area as indicated by the arrows 42, and is discharged around the electrode wire 40 and into the groove 18 to produce an atmosphere which prevents the formation of oxide in the neighborhood of the weld.

Voltage applied between electrode wire 40 and the pipe, and the rate the wire is fed to the arc, may be such that the density of current conducted by the wire is from 200,000–250,000 amperes per square inch of electrode transverse area.

The inner cylindrical surface 22 of the land 20 is aligned with, or is a continuation of, the inner surface 44 of the respective pipes 12 or 10. The thickness of the land 20 may be substantially 1/16 of an inch. The length of the land, as indicated by the line B, may be substantially 1/16 of an inch. The angle of the outwardly beveled end 28 is 30°, more or less, with respect to the plane 32, which plane 32 is perpendicular to the outer cylindrical surface 24 of the land 20.

The pipes or cylindrical members 10, 12, etc., which may be joined to form a pipe line or the like, may be aluminum alloy pipes of from 4 inches to 7 inches, or more in diameter and may be welded manually, or by any suitable machine capable of welding the contiguous joints of such pipes, to produce the pipe line. For example, the machines may be such as disclosed in the patents to Bruno and/or Staley elsewhere identified.

While the form of the invention now preferred has been disclosed as required by statute, other forms may be used, all coming within the scope of the claimed subject matter which follows.

What is claimed is:

1. A method comprising: aligning two substantially equal diameter aluminous cylindrical pipes with contiguous ends and with their central axes substantially aligned, said contiguous ends having been shaped to form a circular fillet receiving groove, each contiguous end having an end land with substantially coaxial inner and outer cylindrical surfaces, the outer cylindrical surface of said land joining an outwardly beveled pipe end edge extending outwardly from its respective land at an angle to a plane perpendicular to said outer cylindrical surface, the contiguous outer ends of said lands substantially butting each other to form a fillet receiving circular opening; and placing a fillet in said groove and circular opening by circularly passing a welding arc forming aluminum alloy electrode wire having the characteristics of the group forming series No. 5000 aluminum alloys longitudinally directed toward said groove; discharging an inert gas around said electrode wire and into said groove; charging said electrode wire relatively to the charge on said pipes to form an arc with an arc forming intensity in the order of 200,000–250,000 amperes per square inch of electrode transverse area.

2. A method according to claim 1 in which said inner cylindrical surface of said land is aligned with the inner surface of its respective pipe, the thickness of said land is made in the order of 1/16″, the length of said land is made in the order of 1/16″, and the angle of said outwardly beveled pipe end edge is substantially 30° to said plane perpendicular to the outer cylindrical surface of said land, said electrode wire being substantially cylindrical and in the order of .035″ diameter, and made of aluminum alloy of high magnesium content, such as of series No. 5000, such as aluminum alloy No. 5356, said pipes having their longitudinal axes horizontal, and said electrode wire being moved in a continuous electrical arc forming condition.

3. A method according to claim 1 in which said inner cylindrical surface of said land is aligned with the inner surface of its respective pipe.

4. A method according to claim 1 in which the thickness of said land is made in the order of 1/16″.

5. A method according to claim 1 in which the length of said land is made in the order of 1/16″.

6. A method according to claim 1 in which said wire is moved in the order of 60 inches per minute.

7. A method according to claim 1 in which the angle of said outwardly beveled pipe end edge is substantially 30° to said plane perpendicular to the outer cylindrical surface of said land.

8. A method according to claim 1 in which said electrode wire is cylindrical and substantially of .035″ diameter.

9. A method according to claim 1 in which said electrode wire is cylindrical and substantially of .035″ diameter, and made of an aluminum alloy selected from the group of aluminum alloys of the series No. 5000.

10. A method according to claim 9 in which said alloy is made of aluminum alloy No. 5356.

11. A method according to claim 1 in which said pipes have their longitudinal axes horizontal, and said electrode wire is moved continuously in electrical arc of at least 360° in said groove.

12. A method comprising: placing two aluminous members with contiguous edges extending substantially side by side, and with their edges having been shaped to form a linear fillet receiving groove, each contiguous edge having a lower shelf with substantially parallel upper and lower surfaces, the upper surface of said shelf joining an outwardly beveled member edge extending outwardly from its respective shelf at an angle to a plane perpendicular to said upper surface of said shelf, the contiguous edges of said shelves substantially forming a butt joint; and placing a fillet in said groove and fillet receiving opening by passing longitudinally of said groove a welding arc forming aluminum alloy electrode wire having the characteristics of the group forming series No. 5000 aluminum alloys, said wire being longitudinally directed toward said groove; discharging an inert gas around said electrode wire and into said groove; charging said electrode wire relatively to the charge on said aluminous members with an arc forming intensity in the order of 200,000–250,000 amperes per square inch of electrode transverse area.

13. A method according to claim 12 in which said lower surface of said shelf is aligned with the lower surface of its respective member, the thickness of said shelf is made in the order of 1/16″, the width of said shelf is made in the order of 1/16″, the angle of said outwardly beveled member edge is substantially 30° to said plane perpendicular to the upper surface of said shelf, said electrode wire is cylindrical and substantially of .035″ diameter, and made of aluminum alloy of high magnesium content, such as of series No. 5000, such as aluminum alloy No. 5356, said members having their lower edges substantially aligned, said wire being moved at a speed in the order of 60 inches per minute.

14. A method comprising: aligning two substantially equal diameter aluminous cylindrical pipes with contiguous ends and with their central axes substantially aligned, said contiguous ends having been shaped to form a circular fillet receiving groove, each contiguous end having an end land with substantially coaxial inner and outer cylindrical surfaces, the outer cylindrical surface of said land joining an outwardly beveled pipe end edge extending outwardly from its respective land at an angle to a plane perpendicular to said outer cylindrical surface, the contiguous outer ends of said lands substantially butting each other to form a fillet receiving circular opening; and placing a fillet in said groove and circular opening by circularly passing a welding arc forming aluminum alloy electrode wire longitudinally directed toward said groove; discharging an inert gas around said electrode wire and into said groove; charging said electrode wire relatively to the charge on said pipes to form an arc with an arc forming intensity in the order of 200,000–250,000 amperes per square inch of electrode transverse area.

References Cited

UNITED STATES PATENTS

| 2,795,689 | 6/1957 | McNutt | 219—125 |
| 2,819,517 | 1/1958 | Pursell | 219—60 |
| 2,956,147 | 10/1960 | Baker | 219—125 |
| 2,960,597 | 11/1960 | Bruno et al. | 219—125 |
| 3,035,156 | 5/1962 | Staley | 219—125 |
| 3,309,492 | 3/1967 | Fields | 219—74 |
| 3,324,275 | 6/1967 | Peignen | 219—60 |

RICHARD M. WOOD, *Primary Examiner.*

W. D. BROOKS, *Assistant Examiner.*